United States Patent
Chung

[19]

[11] Patent Number: 5,819,929
[45] Date of Patent: Oct. 13, 1998

[54] CD CONTAINER STORAGE DEVICE

[76] Inventor: Chih-Wen Chung, P.O. Box 82-144, Taipei, Taiwan

[21] Appl. No.: 897,648

[22] Filed: Jul. 21, 1997

[51] Int. Cl.$^6$ .................................................. B65D 85/30
[52] U.S. Cl. ........................ 206/308.1; 206/504; 206/511
[58] Field of Search ................................. 206/308.1, 309, 206/493, 504, 508, 511; 312/9.11, 9.17, 9.19

[56] References Cited

U.S. PATENT DOCUMENTS

| | | | |
|---|---|---|---|
| 5,366,073 | 11/1994 | Turrentine et al. | 206/309 |
| 5,549,199 | 8/1996 | Lindsay | 206/308.1 |
| 5,704,474 | 1/1998 | Oland | 206/308.1 |
| 5,706,939 | 1/1998 | Yu | 206/308.1 |

*Primary Examiner*—Paul T. Sewell
*Assistant Examiner*—Nhan T. Lam
*Attorney, Agent, or Firm*—A & J

[57] ABSTRACT

A CD container storage device includes an upper cover having a top and a vertical rear side wall and two vertical lateral side walls extending downwardly from three sides of the top, a lower cover having three upwardly extending side walls adapted to engage the three downwardly depending side walls of the upper cover to form a rectangular casing, and a disk holder dimensioned to be fitted into the rectangular casing, whereby a CD and its container can be separately fitted into the CD container storage device and a plurality of similar CD container storage devices can be conveniently connected together as desired.

3 Claims, 5 Drawing Sheets

CD CONTAINER STORAGE DEVICE

BACKGROUND OF THE INVENTION

1. Field of the Invention

This invention is related to an improved CD container storage device and in particular to one in which a CD and its container can be separately fitted.

2. Description of the Prior Art

Devices for storing compact disks (CD) are well known in the art. However, none of the prior art devices available to the public has adequately met all of the goals of: simplicity of design; visual aesthetics; ready accessibility of contents; reliable operations mechanisms; visual accessibility of label information; and reasonable density of storage. Improvements in each of these areas is particularly desirable in the industry.

Therefore, it is object of the present invention to provide an improved CD container storage device which combines all of the desirable characteristics set forth above.

SUMMARY OF THE INVENTION

This invention is related to an improved CD container storage device and in particular to one in which a CD and its container can be separately fitted.

It is the primary object of the present invention to provide a CD container storage device which is convenient to use.

It is another object of the present invention to provide a CD container storage device which can be easily connected with similar CD container storage device as desired.

It is still another object of the present invention to provide a CD container storage device which can keep compact disks and their containers from dust.

It is still another object of the present invention to provide a CD container storage device which is simple in construction and low in cost.

It is a further object of the present invention to provide a CD container storage device which is fit for mass production.

The foregoing objects and summary provide only a brief introduction to the present invention. To fully appreciate these and other objects of the present invention as well as as the invention itself, all of which will become apparent to those skilled in the art, the following detailed description of the invention and the claims should be read in conjunction with the accompanying drawings. Throughout the specification and drawings identical reference numerals refer to identical or similar parts.

DETAILED DESCRIPTION OF THE PREFERRED EMBODIMENT

Figure 1:
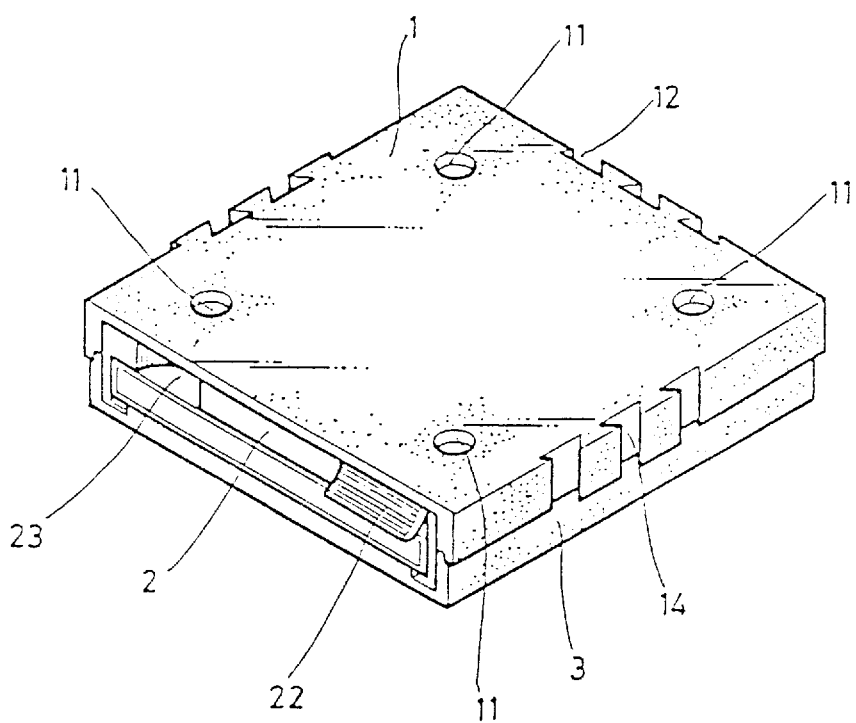
FIG. 1 is a perspective view of a CD container storage device according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
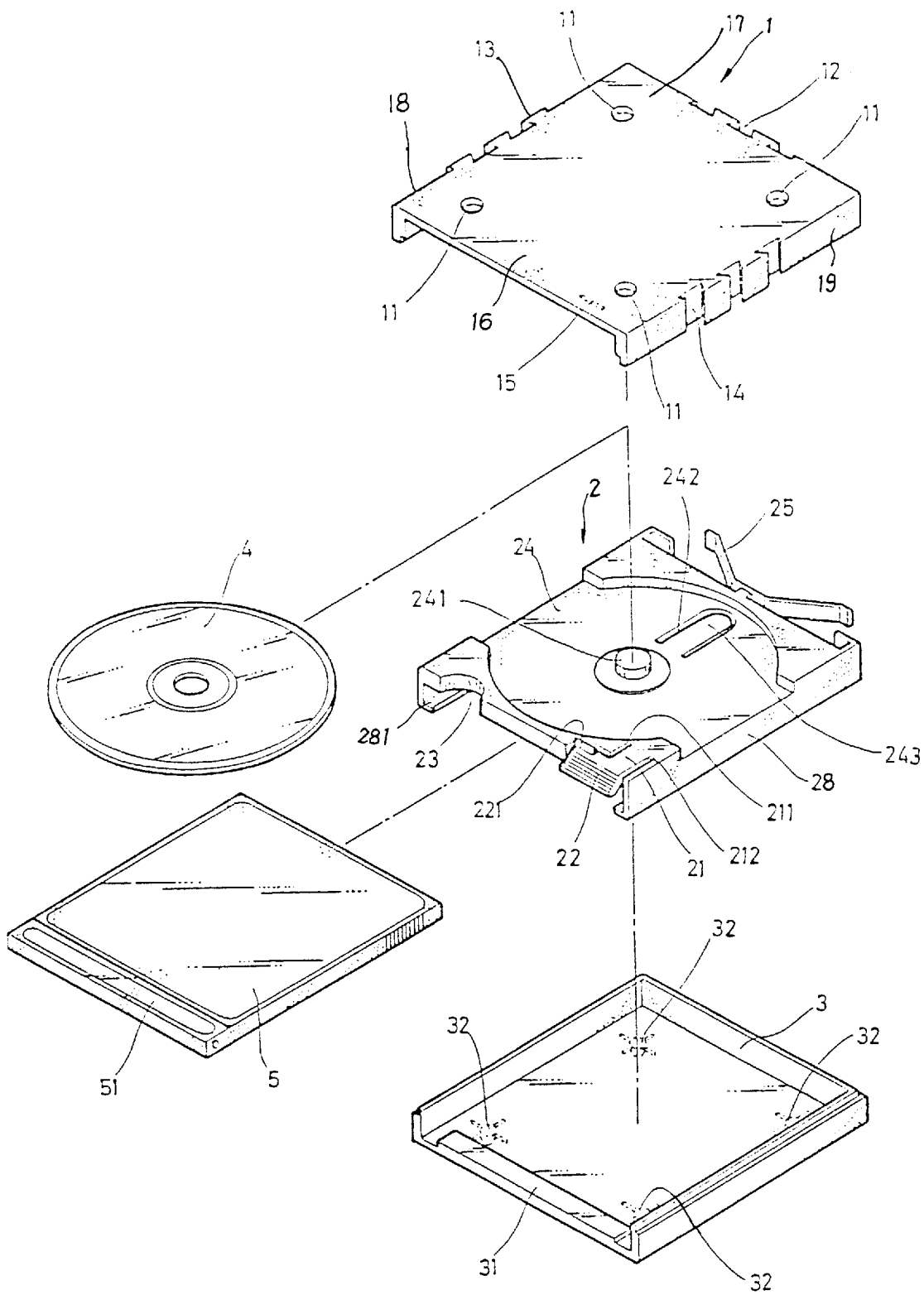
FIG. 2 is an exploded view of the present invention.

With reference to the drawings and in particular to FIGS. 1 and 2 thereof, the CD storage container according to the present invention generally comprises an upper cover 1, a disk holder 2 and a lower cover 3. The upper cover 1 is a rectangular member having a top 16 and a vertical rear side wall 17 and two vertical lateral side walls 18 and 19 extending downwardly from three sides of the top 16. The top 16 is formed with four holes 11 close to its four corners. The three side walls 17, 18 and 19 are formed with a plurality of vertical dovetail grooves 12, dovetails 13, and dovetail grooves 14, respectively. The top 16 has a groove 15 at the bottom side close to the front edge.

The disk holder 2 is also a rectangular member dimensioned to be fitted into the upper cover 1. The disk holder 2 is open at the bottom and has two lateral vertical side walls 21 each provided with an inwardly extending legs 281 at the lower end. The front portion of the disk holder 2 is formed with a L-shaped tab 22 at one corner and a semi-circular notch 23 at the other corner. The L-shaped tab 22 has a neck 21 integral with the disk holder 2 and separated from the disk holder 2 by a straight slot 212 and a L-shaped slot 211 at two sides. The top of the L-shaped tab 22 has a projection 221 adapted to engage with the groove 15 of the upper cover 1. The central portion of the disk holder 2 is formed with a circular recess 24 for receiving a compact disk 4. The disk holder 2 is further provided at the center with a retainer 241 for keeping the compact disk 4 in place. The circular recess 24 has a U-shaped groove 242 with its opening subtending the retainer 241 thereby forming a tongue 242. A resilient member 25 is mounted at the rear side of the disk holder 2 and has two legs extending outwardly from an intermediate portion thereof.

The lower cover 3 is also a rectangular member having three upwardly extending side walls adapted to engage the three downwardly depending side walls of the upper cover 1 to form a rectangular container. The lower cover 3 is formed with a raised rib 31 at the front edge and four protuberances at the bottom which are dimensioned to fit into the corresponding holes 11 of the upper cover 1.

Figure 3:
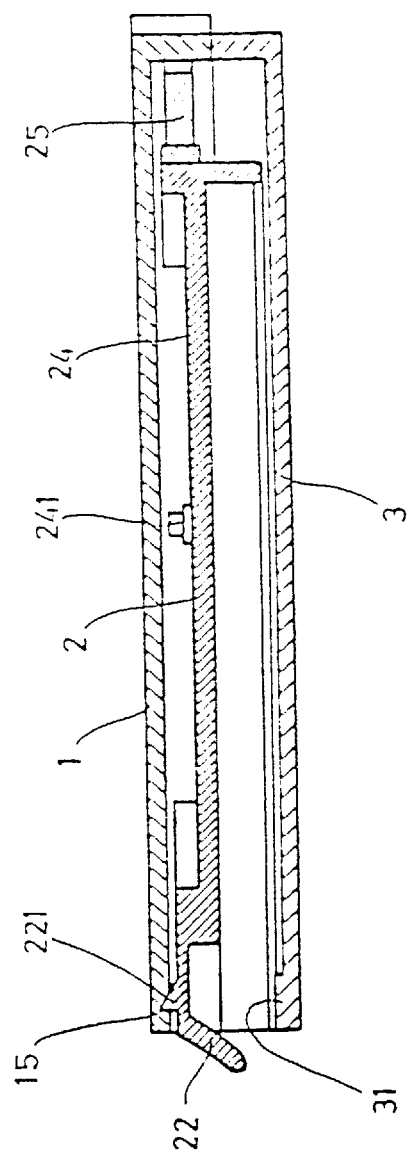
FIG. 3 is a sectional view of the present invention.
Figure 4:
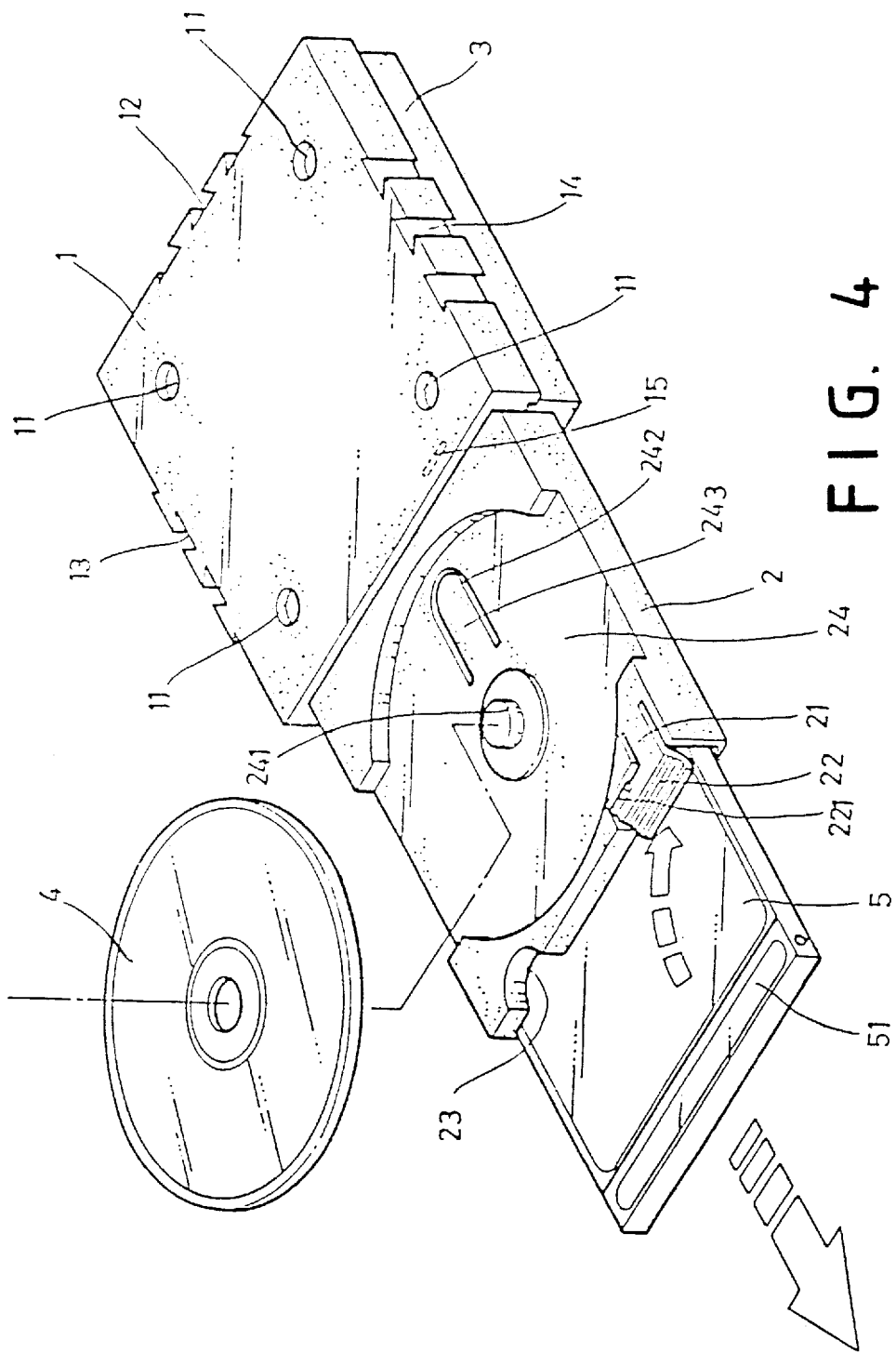
FIG. 4 is a working view of the present invention.

When in assembly, the disk holder 2 is first fitted into the lower cover 1 with its resilient member 25 urging against the inner rear side of lower cover 1 and then the upper cover 1 is snugly engaged with the lower cover 2 to form a rectangular casing with its groove 15 receiving the projection 221 of the L-shaped tab 22 of the disk holder 2 thereby keeping the disk holder 2 within the rectangular casing. In use, the L-shaped tab 22 is depressed so that the resilient member 25 will push the disk holder 2 to go out of the rectangular casing until the rear side wall of the disk holder 2 is in contact with the raised rib 31 of the lower cover thus preventing the disk holder 2 to detach from the rectangular casing (see FIGS. 3 and 4). Then, a CD and a CD container can be fitted in the circular recess 24 of the disk holder 2 and inserted into the two inwardly extending legs 281 of the lower cover 2, respectively. The circular notch 23 is designed for facilitating the removal of the CD container 5 from the bottom of the disk holder 2. Further, an user may conveniently know the title of the CD from the front edge 51 of the CD container 5.

Figure 5:
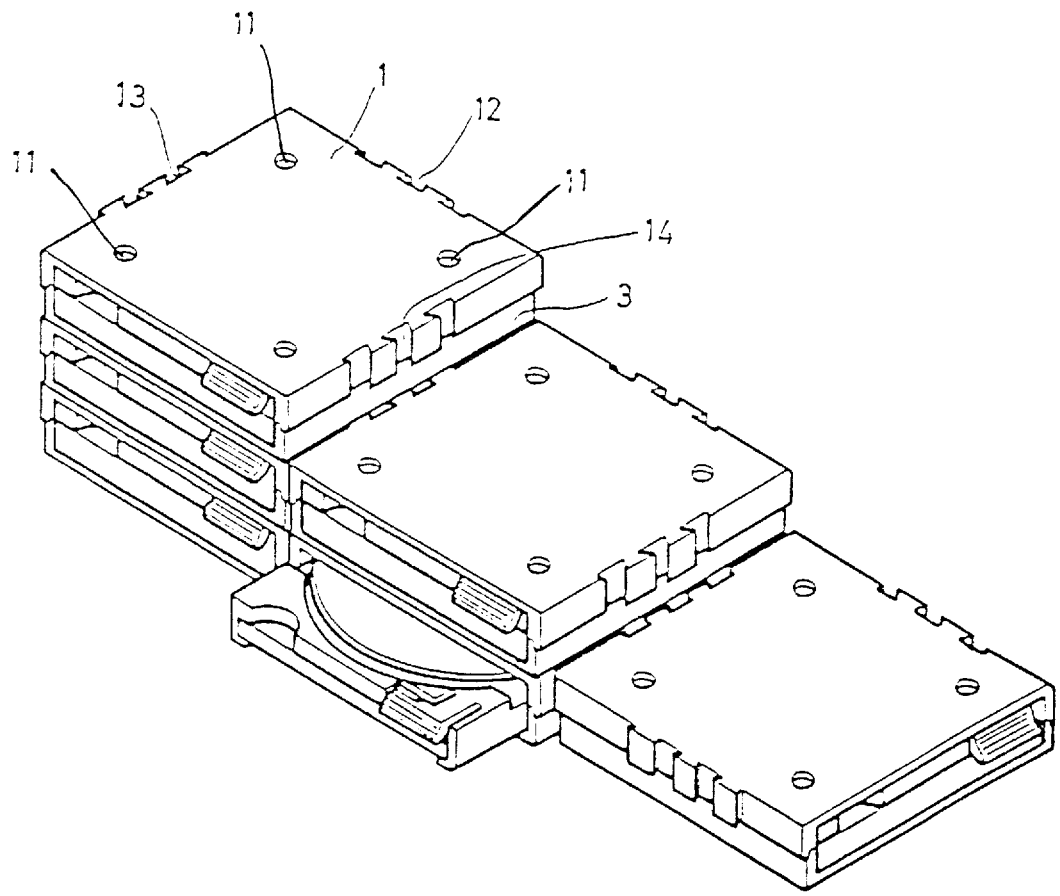
FIG. 5 illustrates a plurality of similar CD container storage devices connected together.

As shown in FIG. 5, the dovetails 13 of the CD container storage devices at the left position are engaged with corresponding dovetail grooves 14 of the CD container storage devices at the intermediate position. Likewise, the dovetails 13 of the CD container storage devices at the intermediate position are engaged with the corresponding dovetail grooves 14 of the CD container storage devices at the right position. In the meantime, the protuberances 32 of the CD container storage devices at the upper position are fitted into the corresponding holes 11 of the CD container storage devices at the lower position. Consequently, a plurality of similar CD container storage devices can be easily connected together.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A CD container storage device comprising:

an upper cover having a top and a vertical rear side wall and two vertical lateral side walls extending downwardly from three sides of said top, said top having a groove at a bottom thereof;

a lower cover having three upwardly extending side walls adapted to engage said three downwardly depending side walls of said upper cover to form a rectangular casing, said lower cover being formed with a raised rib at a front edge thereof; and a disk holder dimensioned to be fitted into said rectangular casing, said holder 2 having an open bottom and two lateral vertical side walls each provided with an inwardly extending legs at a lower end thereof, a front portion of said disk holder being formed with a tab at one corner and a semi-circular notch at another corner, said tab having a neck integral with said disk holder and a projection at a top thereof adapted to engage with said groove of said upper cover, a central portion of said disk holder being formed with a circular recess for receiving a compact disk, said disk holder having a central portion provided with a retainer for keeping said compact disk in place, a resilient member being mounted at a rear side of said disk holder.

2. The CD container storage device as claimed in claim 1, wherein said upper cover is formed with four holes at four corners thereof and said lower cover is provided at a bottom thereof with four protuberances each adapted to fit into a respective one of said holes.

3. The CD container storage device as claimed in claim 1, wherein said side walls of said upper cover are formed with dovetail means.

* * * * *